(12) United States Patent
Lang

(10) Patent No.: US 8,192,832 B1
(45) Date of Patent: Jun. 5, 2012

(54) STRUCTURED PACKING WITH INTERLEAVED HEAT-TRANSFER SURFACES

(76) Inventor: Ko C. Lang, Agoura Hills, CA (US)

( * ) Notice: Subject to any disclaimer, the term of this patent is extended or adjusted under 35 U.S.C. 154(b) by 1069 days.

(21) Appl. No.: 11/903,847

(22) Filed: Sep. 25, 2007

Related U.S. Application Data

(60) Provisional application No. 60/876,389, filed on Dec. 20, 2006.

(51) Int. Cl.
*B32B 3/28* (2006.01)
*B32B 3/30* (2006.01)
*F28F 3/00* (2006.01)

(52) U.S. Cl. ......... 428/167; 428/166; 428/188; 165/166

(58) Field of Classification Search .................. 428/166, 428/167, 172, 188, 192; 165/166, 167, 9.1
See application file for complete search history.

(56) References Cited

U.S. PATENT DOCUMENTS

| | | | |
|---|---|---|---|
| 5,851,636 A * | 12/1998 | Lang et al. .................... 428/167 |
| 6,071,593 A * | 6/2000 | Lang et al. .................... 428/167 |
| 6,322,356 B1 * | 11/2001 | Gupta et al. .................. 432/179 |
| 2001/0040025 A1 * | 11/2001 | Jurisich ......................... 165/148 |

* cited by examiner

*Primary Examiner* — Catherine A Simone
(74) *Attorney, Agent, or Firm* — Melanius D'Souza

(57) ABSTRACT

An extruded, ceramic, structured packing has a plurality of partition-plates attached to end-walls. The partition-plates have a plurality of parallel, interleaved ribs which run from the leading flow-edge to the trailing flow-edge of the partition plate to create a serpentine cross-sectioned flow-channel between an adjacent pair of partition plates and the end-walls.

4 Claims, 6 Drawing Sheets

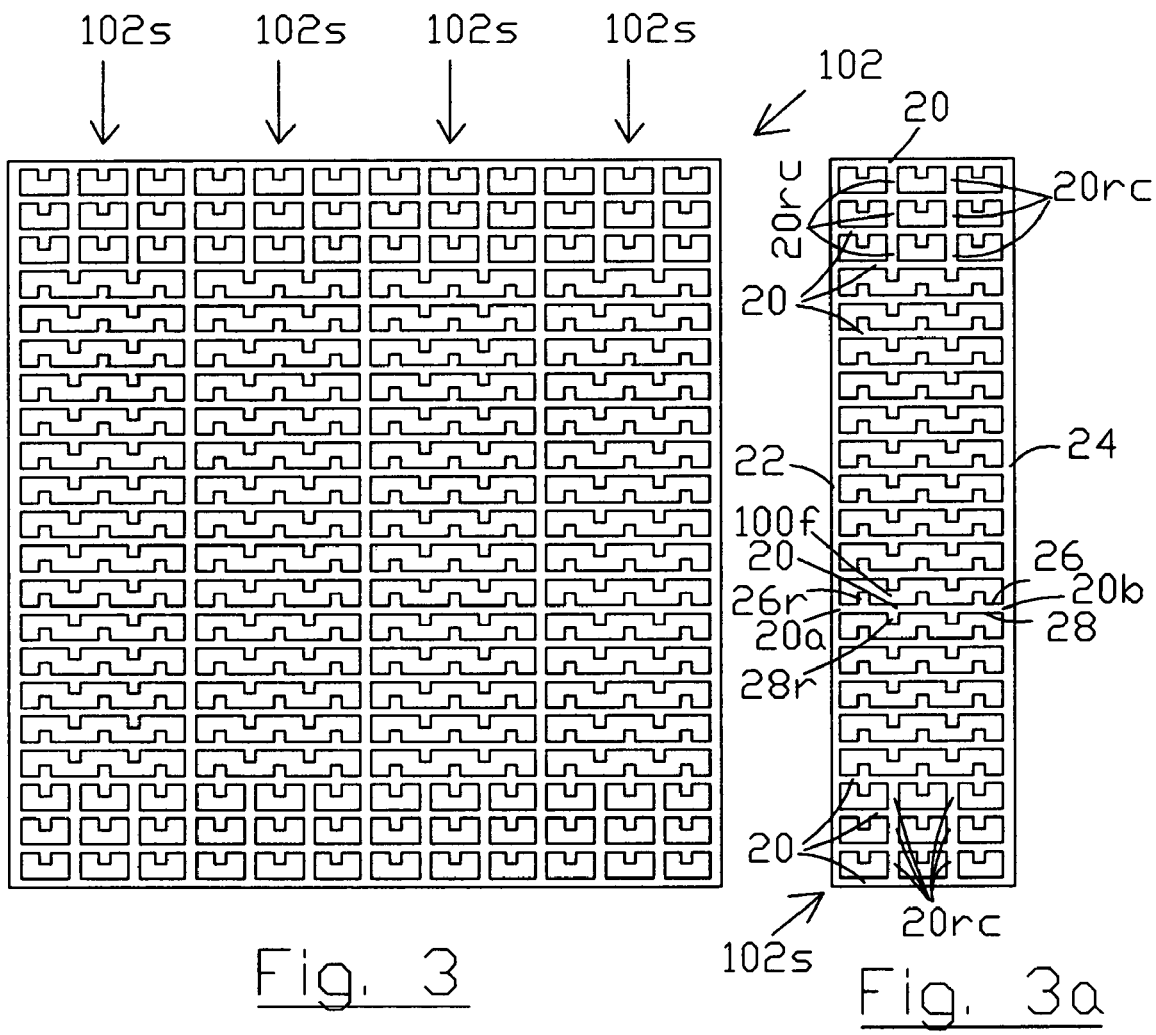

STRUCTURED PACKING WITH INTERLEAVED HEAT-TRANSFER SURFACES

CROSS-REFERENCE TO RELATED PATENT APPLICATIONS

This patent application claims priority from Provisional Patent Application No. 60/876,389 filed on Dec. 20, 2006.

BACKGROUND OF THE INVENTION

1. Field of the Invention

This invention relates generally to ceramic structured (or monolith) packing for use as heat-sink media in regenerative heat-exchangers.

2. Description of the Related Art

The applicant currently produces and successfully markets ceramic structured packing, which is assembled from a plurality of individual plates. Each of these plates has ribs, which are interleaved with the ribs on adjoining plates to produce serpentine cross-sectioned flow channels. Details of the structured packing, which is marketed under the trade-name MLM®, are available in the applicant's web-site at www.lantecp.com.

The operating performance of the MLM has been proved to be vastly superior to that of traditional structured packing which generally have square flow passages (with an aspect-ratio equal to one) or rectangular flow passages or triangular flow passages. Details of such traditional structured packing are available from the websites of manufacturers such as www.rauschert.com, www.ceram.fraunthel.com, and others. It is postulated that the superior performance of the MLM® over traditional structured packing is due to the serpentine cross-section of the flow channels in the MLM®.

However, the present method of manufacturing MLM® is from individual ribbed plates is both time-consuming and expensive because it involves the manual gluing of thousands of individual plates even for a small commercial quantity.

The inventor has therefore devised a process of manufacturing a MLM®-type structured packing which is extruded as a single block but which still retains the same configuration for the flow channels as the prior-art glued-together MLM® structured packing.

SUMMARY OF THE INVENTION

In one aspect of the present invention, a structured ceramic-packing comprises a first end-wall and a second end-wall, a first set of ribbed plates, the set comprising a first plate and a second plate, each having a first end and a second end, a first side and a second side, and a first surface and a second surface, the first surface of the first plate located in opposing relationship to the second surface of the second plate, the first surface of the first plate containing a plurality of parallel, continuous ribs extending from the first surface of the first plate to form parallel channels between the ribs, the second surface of the second plate also containing a plurality of parallel, continuous ribs extending from the second surface of the second plate to form parallel channels between the ribs, the first plate and the second plate of the first set of plates being connected to the first end-wall at their first sides and to the first face of the second end-wall at their second sides to form a flow-channel there between.

In another aspect of the present invention, the width of the ribs on the first surface of the first plate is less than the width of the channel on the second surface of the second plate, the width of the ribs on the second surface of the second plate is less than the width of the channel on the first surface of the first plate, and the ribs on the first surface of the first plate are interleaved with the ribs on the second surface of the second plate.

In another aspect of the present invention, the height of the ribs on the first surface of the first plate is less than the distance between the first surface of the first plate and the second surface of the second plate.

In another aspect of the present invention, the height of the ribs on the second surface of the second plate is less than the distance between the first surface of the first plate and the second surface of the second plate.

In another aspect of the present invention, the height of the ribs on the second surface of the second plate is less than the distance between the first surface of the first plate and the second surface of the second plate.

In another aspect of the present invention, the second surface of the first plate also contains a plurality of parallel, continuous ribs extending from the second surface of the first plate to form parallel channels between the ribs.

In another aspect of the present invention, the first surface of the second plate also contains a plurality of parallel, continuous ribs extending from the first surface of the second plate to form parallel channels between the ribs.

In another aspect of the present invention, the first surface of the second plate also contains a plurality of parallel, continuous ribs extending from the first surface of the second plate to form parallel channels between the ribs.

In another aspect of the present invention, at least one of the plates is planar.

In another aspect of the present invention, the spacing between adjacent ribs on the first plate is larger than the width of the ribs.

In another aspect of the present invention, the spacing between adjacent opposing ribs on the first and second plates is larger than the width of either of the ribs.

In another aspect of the present invention, the ribs have a triangular cross-section.

In another aspect of the present invention, the ribs have a convex cross-section.

In another aspect of the present invention, the structured ceramic-packing further comprises a second set of ribbed plates, the first plate and the second plate of the second set of ribbed plates being connected to the second face of the second end-wall at their first sides.

In another aspect of the present invention, the structured ceramic-packing further comprises a third end-wall, the first plate and the second plate of the second set of ribbed plates being connected to the third end-wall at their second sides.

In another aspect of the present invention, the structured ceramic-packing further comprises a third ribbed is plate connected to the first and second end-walls at its first and second end respectively and to the exposed surface of the first plate by a connecting rib.

In another aspect of the present invention, the structured ceramic-packing further comprises a fourth ribbed plate connected to the first and second end-walls at its first and second end respectively and to the exposed surface of the third plate by a connecting rib.

In another aspect of the present invention, the structured ceramic-packing further comprises a plurality of square or rectangular-cross-sectioned flow passages, a first internal surface of the flow passage containing a plurality of parallel, continuous ribs extending from the first internal surface of the flow passage to form parallel channels between the ribs.

In another aspect of the present invention, the flow passages are arranged in a rectangular array.

In another aspect of the present invention, a second internal surface of the flow passage contains a plurality of parallel, continuous ribs extending from the second internal surface of the flow passage to form parallel channels between the ribs.

In another aspect of the present invention, the second internal surface of the flow passage of the structured ceramic-packing is in opposing relationship to the first internal surface of the flow passage.

In another aspect of the present invention, the height of the rib on the first internal surface of the flow passage of the structured ceramic-packing is less than the distance between the first internal surface and the second internal surface.

In another aspect of the present invention, the ribs on the first internal surface of the flow passage of the structured ceramic-packing are interleaved with the ribs on the second internal surface of the flow passage.

In another aspect of the present invention, a rib on the first internal surface of the flow passage of the structured ceramic-packing is connected to the second internal surface of the flow passage.

DESCRIPTION OF THE DRAWINGS

FIG. 3 is a plan-view representation of another embodiment of a structured packing 102 according to the present invention which is assembled from sub-modules 102s.

FIG. 3a is a plan-view representation of sub-module 102s which comprises structured packing 102 shown in FIG. 3.

DESCRIPTION OF THE INVENTION

Figure 1:
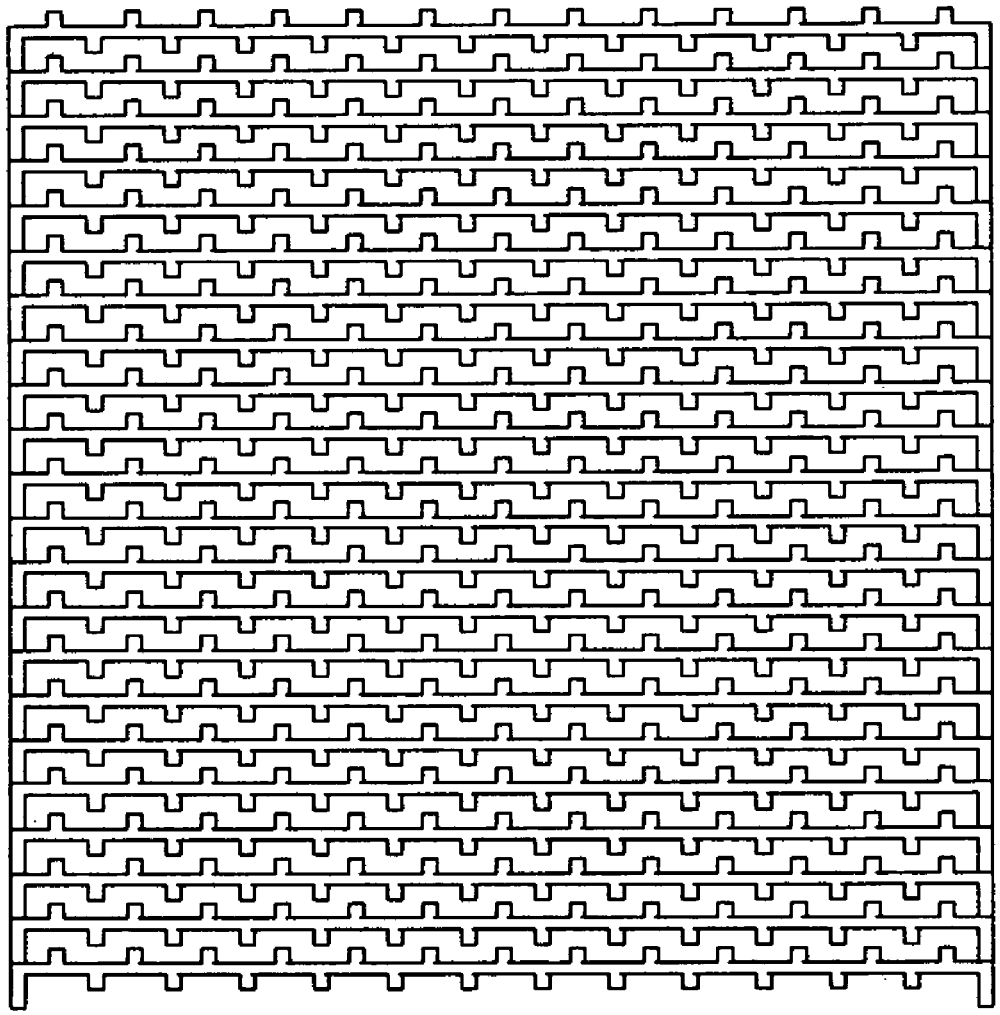
FIG. 1 is a plan-view representation of a MLM® structured packing of the prior art, which is assembled by gluing together individual heat-transfer tiles or plates.
Figure 1B:
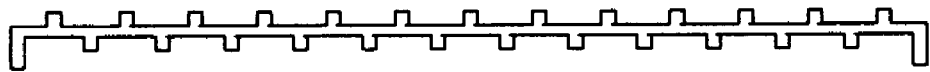
FIG. 1b is a plan-view representation of an individual heat-transfer plate used in MLM® structured packing of the prior art shown in FIG. 1.
Figure 1A:
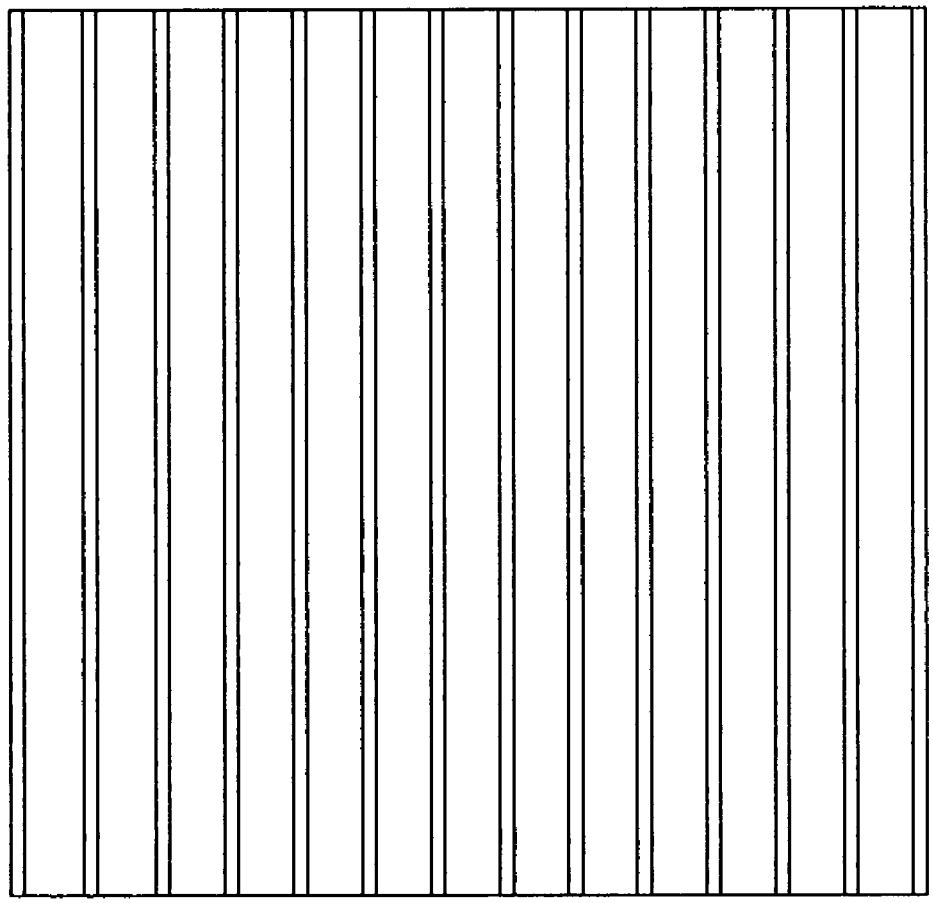
FIG. 1a is an elevation-view representation of an individual heat-transfer plate used in MLM® structured packing of the prior art shown in FIG. 1.

The attached FIG. 1 shows a MLM® structured packing of the prior art, which is assembled by gluing together individual heat-transfer tiles or plates shown in FIGS. 1a and 1b. A detailed description of the MLM® structured packing of the prior art is given in applicant's U.S. Pat. No. 6,071,593.

Figure 2:
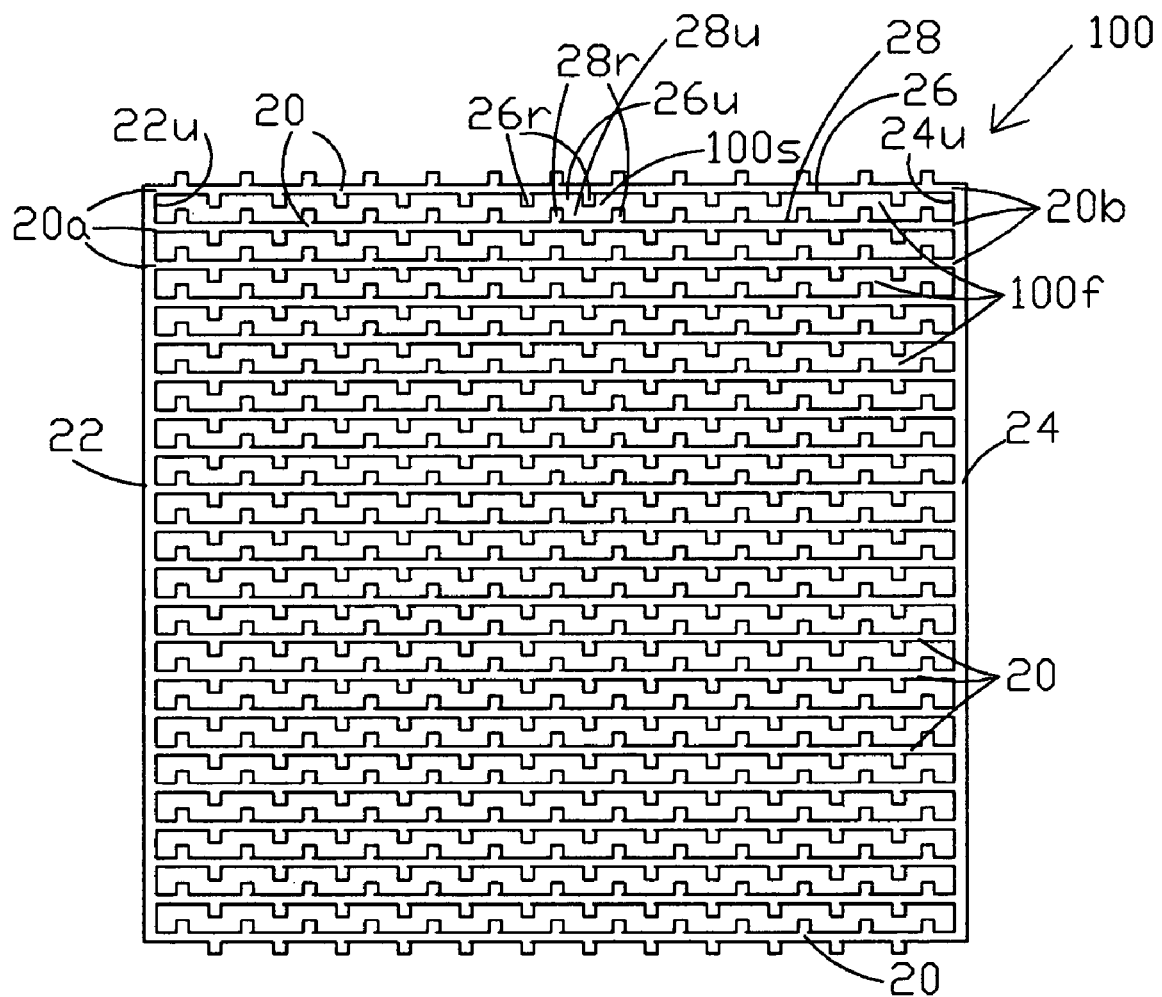
FIG. 2 is a plan-view representation of a single structured packing 100 according to the present invention.

FIG. 2 shows a structured packing 100 according to the present invention. Structured packing 100 is created as a single block by extruding the wet clay through a die designed to produce the cross-section shown in FIG. 2. The cross-section is similar to the cross-section of the assembled MLM® structured packing shown in FIG. 1, though the overall dimensions could vary depending on manufacturing constraints. For example, extruded structured packing 100 has a nominal cross-sectional dimension of 6-inches by 6-inches compared to the assembled MLM® structured packing of the prior art which has a nominal cross-sectional dimension of 4-inches by 4-inches. The larger size reduces the labor required for assembly in regenerative heat-exchangers or incinerators.

Structured packing 100 of the present invention has flow passages 100f for the through-flow of the gas through structured packing 100. As can be seen by comparing FIGS. 1 and 2, flow-passage 100f has a cross-section which is generally similar to the cross-section of the assembled MLM® packing of the prior art. However, extruded structured packing 100 is easier and less expensive to manufacture than the MLM® packing because the manual gluing of individual heat-transfer plates or tiles to create the MLM® packing is eliminated.

Refer now to FIG. 2, which shows a single structured packing 100 according to the present invention.

Figure 2B:
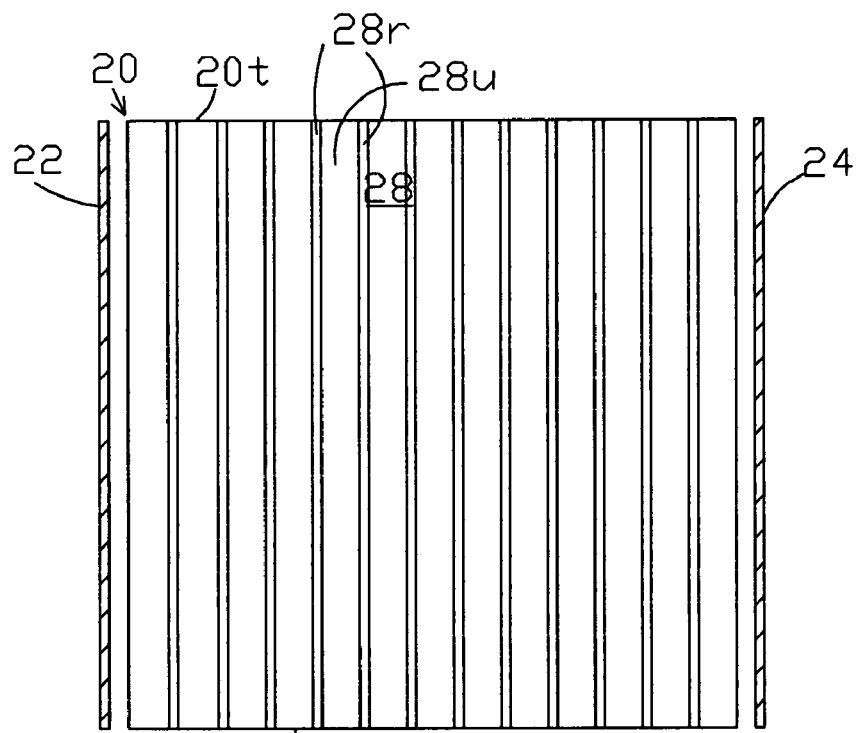
FIG. 2b is an elevation-view representation of an individual partition plate 20 of structured packing 100 of FIG. 2.
Figure 2C:
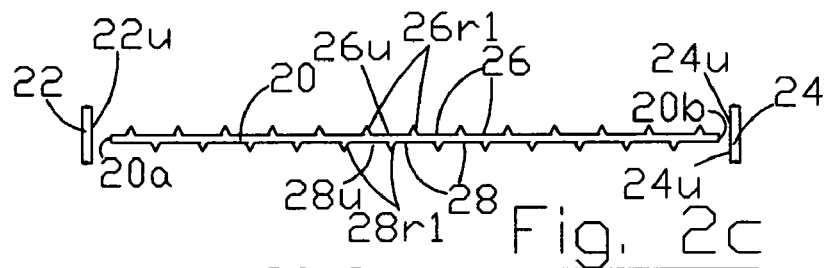
FIG. 2c is a plan-view representation of a rib with a Triangular cross-section on partition plate 20.
Figure 2D:
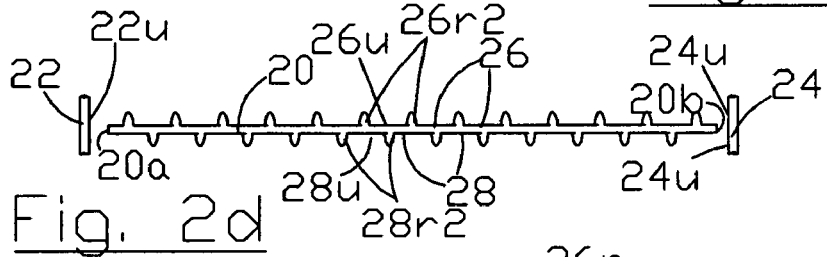
FIG. 2d is a plan-view representation of a rib with a convex cross-section on partition plate 20.
Figure 2A:
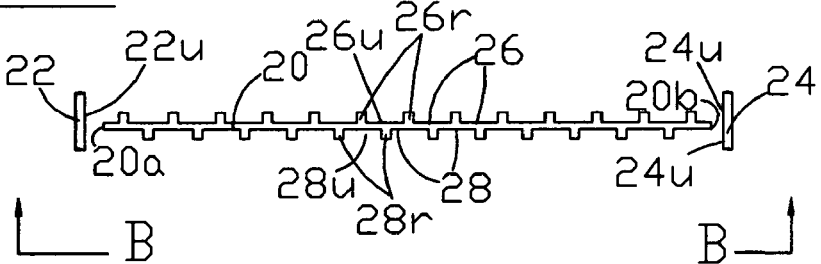
FIG. 2a is a plan-view representation of an individual partition plate 20 of structured packing 100 of FIG. 2.

Structured packing 100 comprises a plurality of partition plates 20 attached at their sides 20a, 20b to unitary end walls 22 and 24 to form flow channels 100f which extend from leading edge 20e to trailing edge 20t of partition plates 20. FIGS. 2a and 2b show details of an individual partition plate 20 of structured packing 100 of FIG. 2. For clarity, plate 20 is shown detached from end-walls 22 and 24. However, in practice, plate 20 is fused to end-walls 22 and 24 during the extrusion is process.

Each flow channel 100f is therefore bounded by a face 26 of a first partition plate 20 and a face 28 of a second partition plate 20 and by an unobstructed surface 22u of end wall 22 and by an unobstructed surface 24u of end wall 24.

Plate 20 contains a plurality of parallel ribs 26r extending from side 26 of partition plate 20. Plate 20 also contains a plurality of parallel ribs 28r extending from side 28 of partition plate 20. The space between two adjacent ribs 26r forms a channel 26u while the space between two adjacent ribs 28r forms a channel 28u. As shown in FIG. 2, in structured packing 100, a plurality of plates 20 are attached at a generally equal spacing and parallel to each other to end-walls 22 and 24 so that sides 26 of plates 20 face the same direction. Because of this ladder-like construction, ribs 26r project partially into channels 28u of an adjacently located plate 20. Thus the arm of a channel 26u merges with the arm of a adjacent channel 28u to form a S-shaped channel 100s between a pair of ribs 26r on first partition plate 20 and a pair of ribs 28r on adjacent partition plate 20. A continuous series of S-channels 100s combine to form flow passage 100f between first partition plate 20 and second partition plate 20 and end-walls 22 and 24. Therefore ribs 26r on first partition plate 20 and ribs 28r on second partition plate 20 are interleaved to provide a highly-efficient heat-transfer surface.

Thus, the volume between adjacent plates 20 and end-walls 22 and 24, which is unobstructed by ribs 26r and 28r, forms the serpentine flow channel 100f described above in FIG. 2.

It will be obvious that, for ribs 26r to project into opposing channel 28u, the width of rib 26r has be less than the width of channel 28u. Similarly, it will be obvious that, for ribs 28r to project into opposing channel 26u, the width of rib 28r has be less than the width of channel 26u.

As shown in the cross-sectional representation of FIG. 2, a vertically-stacked array of plates 20 is connected to end-walls 22 and 24 in a ladder-type configuration to create structured packing 100 of the present invention. As can be seen in FIG. 2, structured packing 100 provides a vertical array of serpentine flow channels 100f.

It will be obvious that ribs 26r and 28r can have different configurations. For example, as shown in FIG. 2c, modified ribs 26r1 could have a Triangular cross-section. Alternately, as shown in FIG. 2d, modified ribs 26r2 could have a convex cross-section. Yet other cross-sectional configurations for the ribs will be obvious to one of ordinary skill in the art. It will also be obvious of any combination of ribs of different cross-sections could be used on plate 20. For example, on a single plate 20, rib 26r could be triangular 26r1 while rib 28r could be convex 26r2.

Further, the dimensions mentioned above are examples only of the typical sizes of extruded monolith packing that can be fabricated using the methods disclosed herein. Other sizes and dimensions will be obvious to one of skill in the art and will be constrained only by manufacturing process and handling constraints.

FIG. 3 shows another embodiment 102 of the structured packing of the present art, which is currently marketed by the applicant under the trade-name "LanteComb™". As shown in FIG. 3, structured packing 102 of the present invention comprises a horizontally fused series of sub-modules 102s as shown in FIG. 3a. Each sub-module 102s is a building block, which comprises a vertically stacked array of ribbed interleaved plates 20 as described above for FIG. 2. Further, in each sub-module 102s, adjacent pairs of bottom four plates and the top four plates are connected to each other by connecting ribs 20rc to provide structural strength.

As shown in FIG. 3, in structured packing 102 of the present invention, a horizontal series of sub-modules 102s are concatenated with common end-walls. Thus, the right end-wall 24 of first sub-module 102s is merged with the left end-wall 22 of the second sub-module 102s to provide a common, internal end-wall between first sub-module 102s and second sub-module 102s. Similarly, the right end-wall 24 of second sub-module 102s is merged with the left end-wall 22 of the third sub-module 102s to provide a common, internal end-wall between second sub-module 102s and third sub-module 102s. It will be obvious that any number of sub-modules can be thus fused together to provide structured packing 102 of any required width.

Yet other refinements and modification of the structured packing of the present invention as described above will be obvious to one of ordinary skill in the art.

Figure 4:
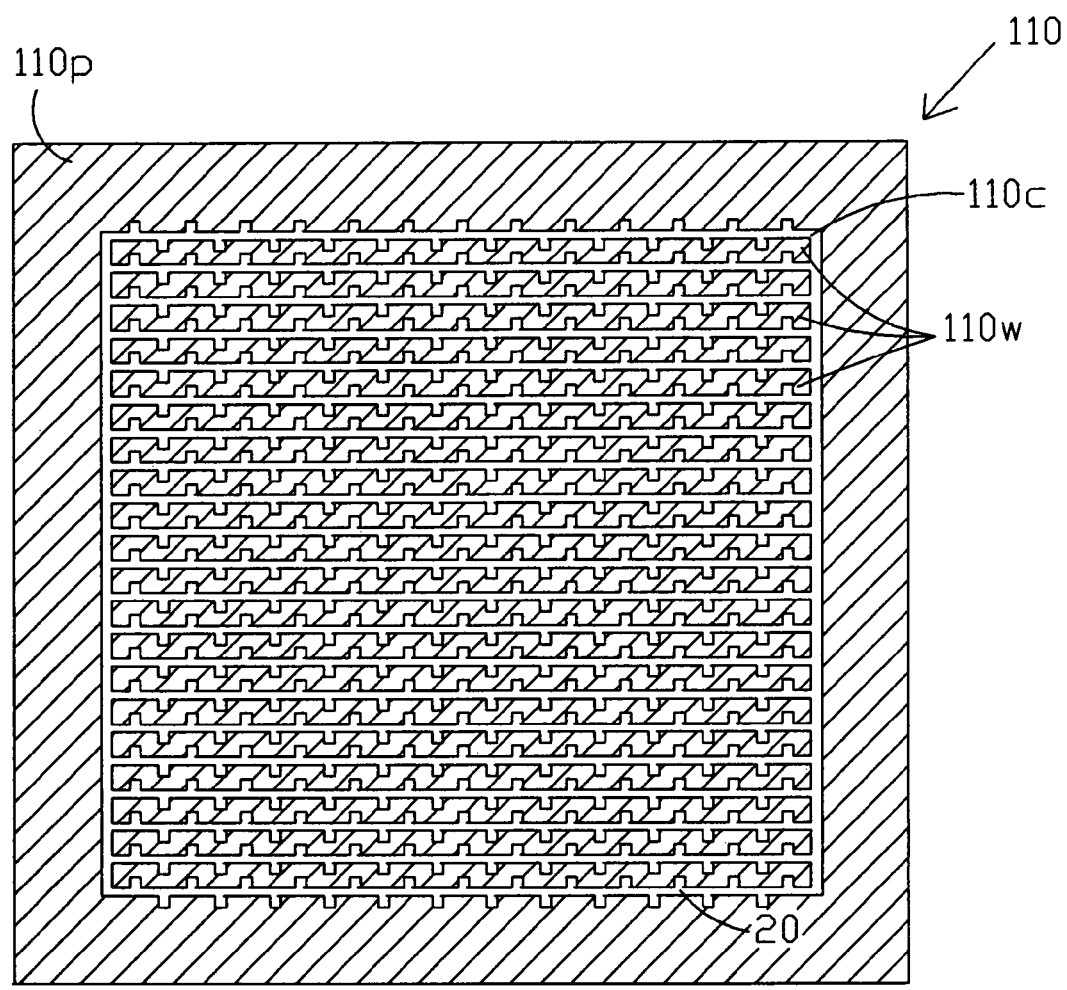
FIG. 4 is a plan-view cross-sectional representation of a die 110 which is used to manufacture structured packing 100 shown in FIG. 2.

To manufacture the structured packing of the present invention as described above in FIG. 2, processed clay is extruded through a die 110 having a cross-sectional profile shown in FIG. 4. As will be obvious to one of ordinary skill in the art, the cross-sectional profile of die 110 is a negative image of the cross-sectional profile of structured packing 100 of FIG. 2. The processed clay is forced through the open spaces between peripheral wall 110p and the parallel, serpentine, web-members 110w of die 110 to extrude a continuous structured packing having the unitary cross-sectional profile shown in FIG. 2. The continuous structured packing is cut into suitable lengths to produce a green structured packing. The green structured packing is first air-dried and later fired in a kiln to produce the finished structured packing 100 of FIG. 2.

Similarly, it will be obvious that to manufacture the structured packing of the present invention as described above in FIG. 3, processed clay is extruded through a die having a cross-sectional profile which is a negative image of the cross-sectional profile of structured packing 102 shown in FIG. 3.

The manufacturing process for making structured packings 100 and 102 is similar to that practiced for other packings of the prior art. The composition and metallurgical properties of the processed clay are chosen to provide the required physical and thermal characteristics of the finished structured packing after firing of the green product in a kiln. The know-how of manufacturing structured packings 100 and 102 is therefore considered to be within the knowledge base of one of ordinary skill in the art and hence is not detailed herein.

All of these other embodiments and variations are considered to fall within the scope of the present invention, which should be limited only by the scope of the following claims.

I claim:

1. A structured ceramic-packing comprising:
   a plurality of square or rectangular-cross-sectioned flow passages arranged in a geometric array,
   the flow passages having a first internal surface and a second internal surface located opposite the first internal surface, the first and second internal surfaces of the flow passage containing a plurality of parallel, continuous ribs extending from the first and second internal surfaces to form parallel channels between the ribs, the ribs on the first internal surface of the flow passage being interleaved with the ribs on the second internal surface of the flow passage and wherein the height of at least one of the ribs on the first internal surface of the flow passage is less than the distance between the first internal surface and the second internal surface and wherein another one of the ribs on the first internal surface of the flow passage is connected to the second internal surface of the flow passage.

2. A structured ceramic-packing comprising:
   a unitary transverse cross-section having a plurality of longitudinal square or rectangular-cross-sectioned flow passages therein,
   a first internal surface of the flow passage containing a plurality of parallel, continuous ribs extending from the first internal surface of the flow passage to form parallel channels between the ribs,
   a second internal surface of the flow passage containing a plurality of parallel, continuous ribs extending from the second internal surface of the flow passage to form parallel channels between the ribs, and wherein
      the second internal surface of the flow passage is located in opposing relationship to the first internal surface of the flow passage,
      and the height of the rib on the first internal surface of the flow passage is less than the distance between the first internal surface and the second internal surface,
      and the ribs on the first internal surface of the flow passage are interleaved with the ribs on the second internal surface of the flow passage,
      and a rib on the first internal surface of the flow passage is connected to the second internal surface of the flow passage.

3. The structured ceramic-packing of claim 2 wherein the flow passages are arranged in a geometric array.

4. The structured ceramic-packing of claim 3 wherein the flow passages are arranged in a rectangular array.

* * * * *